2,186,330

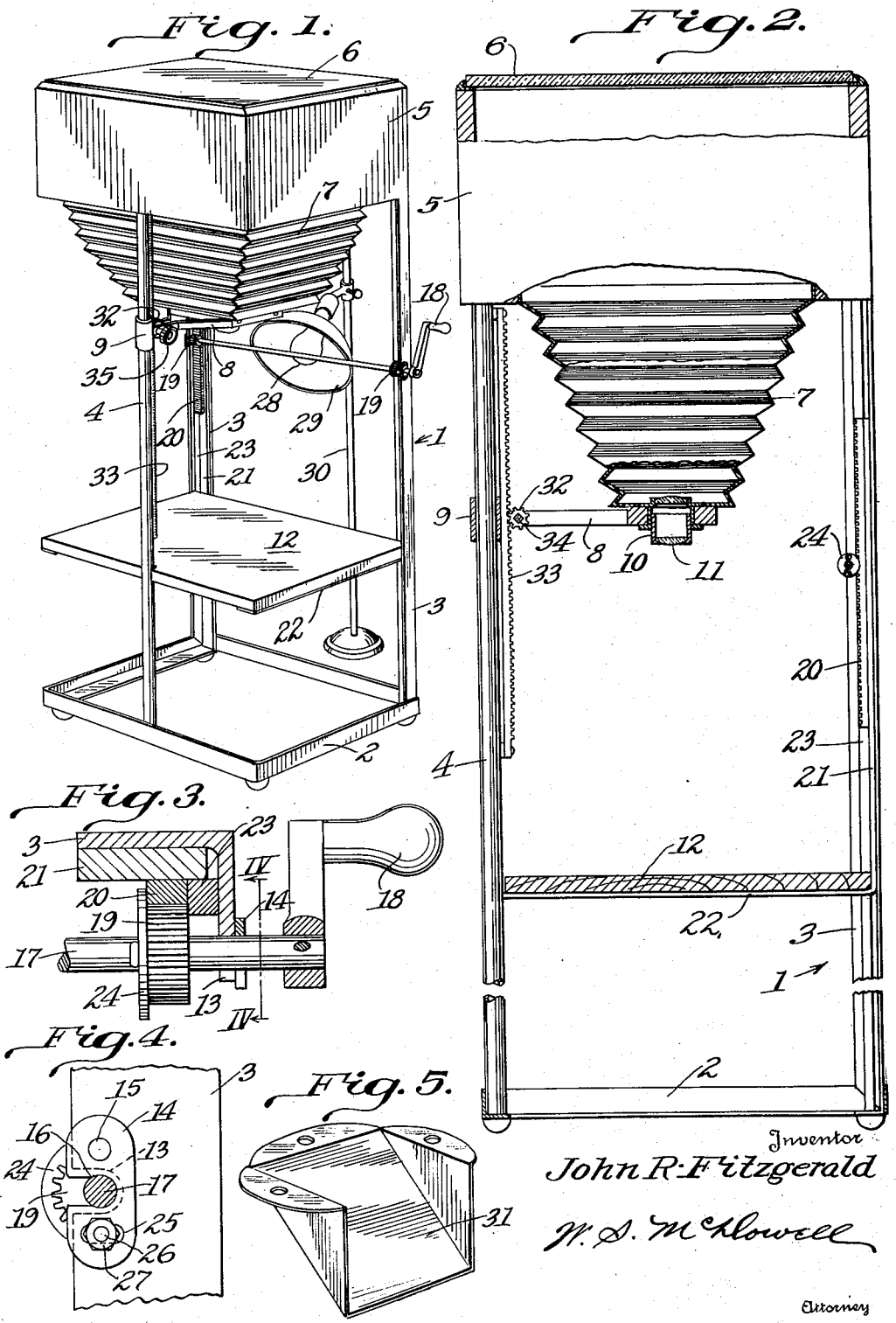
Jan. 9, 1940.   J. R. FITZGERALD   2,186,330
COPYING, TRACING, AND REPRODUCING APPARATUS
Filed Dec. 7, 1937
Inventor
John R. Fitzgerald Patented Jan. 9, 1940

UNITED STATES PATENT OFFICE 2,186,330

COPYING, TRACING, AND REPRODUCING APPARATUS

John R. Fitzgerald, Columbus, Ohio

Application December 7, 1937, Serial No. 178,551

1 Claim. (Cl. 88—24)

This invention relates to tracing apparatus of the type adapted for use by draftsmen, artists and others for the purpose of facilitating the copying or reproduction of drawings, maps, prints and other objects. To this end, the invention comprehends apparatus embodying a frame having a substantially transparent plate arranged in a horizontal plane in the top thereof. Beneath the plate there is arranged for vertical adjustment a camera bellows which carries at its lower end a shutterless camera lens, and below the lens, the frame of the apparatus carries a vertically adjustable object holder. In such apparatus, provision is made for strongly illuminating an object placed on said holder and for adjusting the holder and the bellows relative to the frame and with respect to each other, so that sharp well-defined images of an object placed on the holder in desired proportions will be projected on the glass plate in order to enable the user of the apparatus to trace, copy or otherwise reproduce in desired scale from such images the object or objects disposed in the field or exposure of the camera lens.

An object of the invention is to improve, simplify and to render more useful, economical and practical, apparatus of the character and for the purposes above set forth.

Another object resides in the provision of improved means for controlling the vertical adjustment of the object holder in the supporting frame of the apparatus, in order that the object on the holder may be brought into and retained in desired focal relationship with the bellows lens.

For a further understanding of the invention, reference is to be had to the following description and the accompanying drawing, wherein:

Fig. 1 is a perspective view of the tracing or reproducing apparatus comprising the present invention;

Fig. 2 is a view partly in vertical section and side elevation of said apparatus;

Fig. 3 is a detail horizontal sectional view taken through the manually controlled means for effecting vertical adjustment of the object holder;

Fig. 4 is a detail sectional view on the line IV—IV of Fig. 3;

Fig. 5 is a perspective view of an attachment reflector for the lens of the apparatus, by which laterally placed objects are brought into the range of the lens.

Referring more particularly to the drawing, the tracing or reproducing apparatus comprising the present invention includes a supporting frame 1. In this instance, the frame comprises a rectangular floor section 2, from the rear corners of which arise a pair of spaced, vertical angle bars 3, while intermediately of its length, the front of the floor section 2 has rigidly joined therewith an upstanding cylindrical rod 4. Suitably connected with the upper portions of the bars 3 and the rod 4 is a box-like casing 5, the top of this casing being equipped with a clear glass plate, as indicated at 6.

The open bottom of the casing is connected with an accordion type adjustable camera bellows 7, the lower end of which is supported by means of bifurcated arms 8 which integrally project from a sleeve 9, slidably carried by the rod 4. It will be observed that by adjusting the positions of the sleeve 9 on the vertical rod 4, corresponding adjustment of the bellows 7 may be effected. Formed in connection with the bottom of the bellows 7 is a barrel 10, in which is positioned a shutterless camera lens 11.

Disposed below the bellows 7 and vertically adjustable in the frame 1 is an object holder 12. The latter, in this instance, consists of a substantially rectangular table or shelf, which can be adjusted vertically in relation to the lens 11. To effect and retain such adjustments of the holder, the angle bars 3 are provided with horizontally registering notches 13. Contiguous to these notches, the bars 3 carry pivotally movable bearing plates 14, the pivotal supports of the latter being indicated at 15. The plates 14 are formed with bearing openings 16 for the rotatable reception of a horizontally extending shaft 17, which extends across the full width of the frame and is supported, as stated, by the adjustable plates 14 carried by each of the bars 3. At one end the shaft 17 is equipped with a crank handle 18 in order to effect its convenient manual rotation. The shaft 17 is provided with fixed gears 19, which are adapted to mesh with a pair of gear racks 20 secured to a pair of vertical metallic straps 21, which are slidably movable along the angle bars 3, the lower ends of said straps terminating in forwardly and horizontally extending portions 22, which serve as supports for the object holder or shelf 12. Stationary vertical guide bars 23 are secured to the angle bars 3 in order to provide vertical guides for the straps 21. In this connection, guide washers 24 are arranged on the shaft 17 adjacent to one side of the gears 19, the said washers possessing a diameter to enable the same to engage with the sides of the racks 20, the guide bars 23 engaging the other sides of said racks so that the latter will be confined for vertical movement only in connection with the angle bars 3. The meshing engagement of the teeth of the gears 19 with the teeth of the racks 20 may be regulated by adjusting the plates 14 about their pivotal supports 15. Such adjustment can be maintained by providing the lower portions of said plates with elongated slots 25 in which are positioned threaded studs 26 projecting laterally from the angle bars 3, the outer ends of said studs being equipped with binding nuts 27 to maintain the adjustment of the plates and the shaft 17 carried thereby.

By rotating the crank handle 18, rotation will be imparted to the shaft 17 and its gears 19. Since the latter mesh constantly with the teeth of the racks 20, it will be seen that the latter will be moved vertically of and parallel to the angle bars 3, thereby raising and lowering the object holder 12. The latter is comparatively light in weight and there is sufficient friction between the teeth of the gears 19 and those of the racks 20, as well as in the guides for the straps 21, to enable the holder to be retained in its various positions of adjustment without involving the use of further clamping devices.

In the use of the apparatus, a drawing, map or other object to be traced or reproduced is placed on the upper surface of the holder 12. The crank handle 18 is then rotated to bring the object disposed on the holder into desired focal relationship with the bellows lens 11. Strong light obtained from the incandescent lamp 28 and its associated reflector 29 is then cast on the object carried by the holder, so that the images of such objects will be caught by the lens and refracted upon the glass plate 6 at the top of the apparatus. The scale of these images is rendered variable by the adjustment of the holder and/or the bellows relative to the frame 1. Tracing paper may be placed on the plate 6 and the object images thereof conveniently reproduced.

Not only is the apparatus described used for draftsmen and artists but it may also be employed advantageously in producing light impressions on fast photographic or photostatic paper, or on corresponding photographic film or plate. Moreover, the machine is adapted to the forming of line negatives, which can be used in making zinc and copper etchings. Such negatives can also be used in the forming of off-set plates, as well as positives for silk screen photo-stencils. With the addition of a screen half-tone and screen tints negatives from zinc and copper etchings and off-set plates can be made.

The support for the lamp 28 and the reflector 29 may be either a part of the frame 1 or carried by a separate standard, as shown at 30. The latter arrangement is preferred since it provides for greater facility in the positioning of the light source. If an object is of such size that it cannot be conveniently placed on the holder 12, it may be brought into the focal range of the lens by the provision of the plane angular reflector 31, disclosed in Fig. 5 of the drawing. This latter reflector may be detachably secured to the lower end of the bellows 7, so that an object disposed laterally of the apparatus may be brought into the range of the reflector 29 and the lens 11.

The adjustment of the sleeve 9 on the rod 4 is preferably accomplished by the provision of a gear 32, meshing with the teeth of a stationary rack 33, carried by the rod 4. The shaft 34 of the gear 32 is equipped at one side with a hand knob 35 by means of which the gear 32 may be rotated to cause the raising and lowering of the arms 8 and the bellows 7.

From the foregoing, it will be seen that the present invention provides a simple, compact and efficient reproducing instrumentality of the character indicated, and one which may be easily and conveniently controlled in adapting the same to its various uses. While I have described what I consider to be the preferred form of my present invention, nevertheless it will be understood that the construction herein recited in detail is subject to considerable variation and modification without departing from the scope and spirit of the following claim.

What is claimed is:

In copying, tracing and reproducing apparatus, a frame including a pair of spaced parallel vertically disposed angle bars, the latter having the edges thereof notched, a manually rotatable shaft positioned in the notches of said angle bars, bearing plates pivotally carried by said angle bars for effecting the rotatable support of said notches, clamping means carried by said angle bars for maintaining said plates in fixed positions of adjustment, a pair of gears rotatable with said shaft and disposed adjacent to the ends of the latter, vertical guides carried by said angle bars, gear racks vertically movable in said guides and disposed in meshing engagement with the teeth of said gears, and an object holder supported by and movable in unison with said racks.

JOHN R. FITZGERALD.